Figure 1:
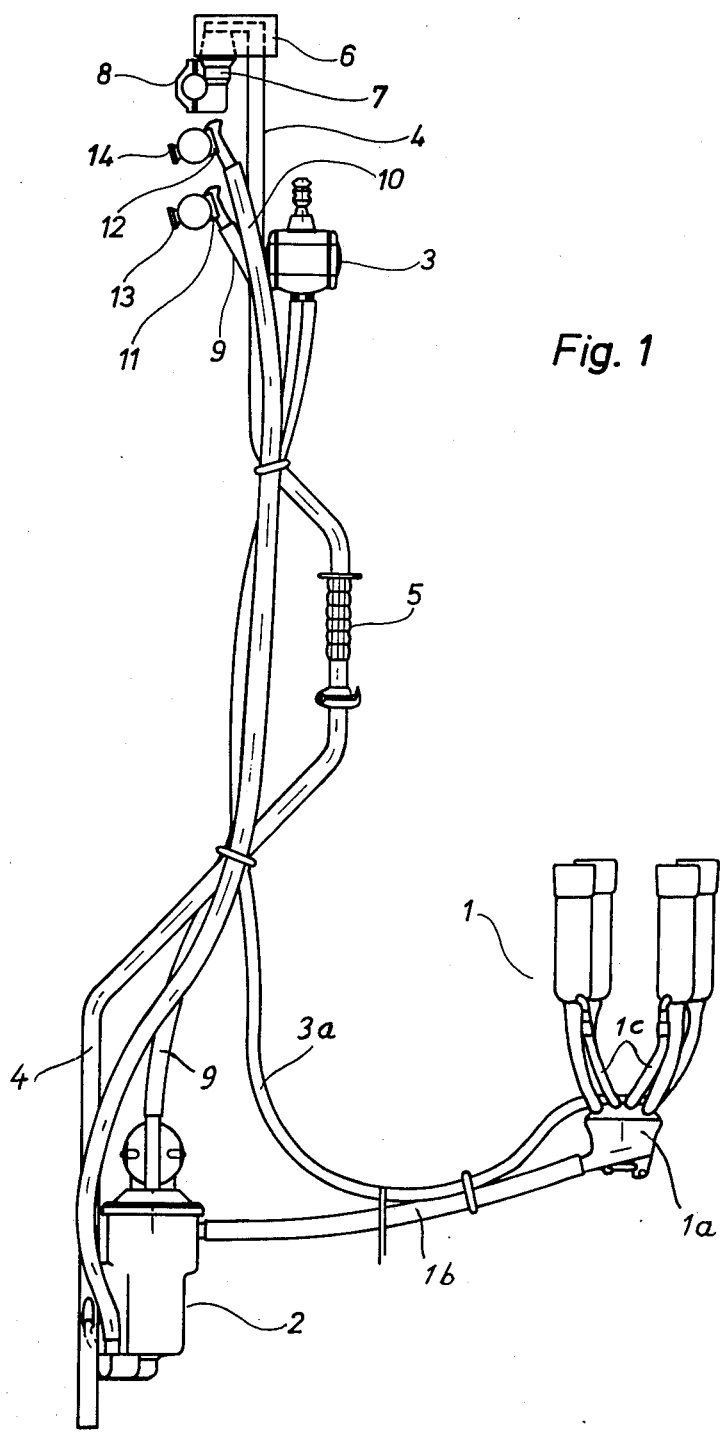

United States Patent [19]

Olander

[11] 4,214,552

[45] Jul. 29, 1980

[54] VALVE COUPLING FOR VACUUM LINE

[75] Inventor: Karl E. Olander, Sodertalje, Sweden

[73] Assignee: Alfa-Laval AB, Tumba, Sweden

[21] Appl. No.: 944,128

[22] Filed: Sep. 20, 1978

[30] Foreign Application Priority Data

Oct. 14, 1977 [SE] Sweden .................................. 7711584

[51] Int. Cl.² .......................... A01J 7/00; F16L 37/28
[52] U.S. Cl. ................................ 119/14.01; 251/149.7
[58] Field of Search .................. 119/14.01; 251/149.6, 251/149.7

[56] References Cited

U.S. PATENT DOCUMENTS

| | | | |
|---|---|---|---|
| 2,647,767 | 8/1953 | Anderson | 251/149.7 |
| 3,361,406 | 1/1968 | Cruse | 251/149.7 |

Primary Examiner—Hugh R. Chamblee
Attorney, Agent, or Firm—Cyrus S. Hapgood

[57] ABSTRACT

A mobile milking unit has a pipe rigidly secured to a first connection means coacting with a second connection means at the inlet of a valve through which the unit can be releasably connected to a vacuum line, a valve body in the valve housing normally closing the passage between the valve inlet and the vacuum line. When the two connection means are coupled together, the valve body is automatically moved to open said passage and thus create in the valve housing a vacuum which serves to hold the two connection means together with a pierced truncated cone of the second connection means closely fitted into a socket of the first connection means, one of said connection means being elastic to facilitate its release from the other connection means.

3 Claims, 3 Drawing Figures

VALVE COUPLING FOR VACUUM LINE

The present invention relates to a coupling device of the type comprising a valve for connecting an external object, provided with a first connection means, to a vacuum line, the external object being a milking means or the like. The valve includes a valve housing having an outlet connectable to the vacuum line and also having an inlet provided with a second connection means, and a valve body operable by a spring to shut the passageway between the inlet and the outlet of the valve housing.

For milking cows with a mobile milking unit in a system provided with a stationary vacuum line, different types of coupling devices have been used for connecting the milking unit to the vacuum line. Recently developed milking systems comprise mobile compact units, such as units for separating air and foam from milk, connected to the milking means. These compact units are to be connected to the vacuum line but must be supported and fixed during the milking operation. Valve designs used heretofore have not been satisfactory for accommodating a mobile compact unit associated with the milking means. It has become obvious that cows have a tendency to kick down the milking unit, if there are no special arrangements preventing this. Thus, it has been necessary to use relatively complicated designs with separate valve means and fixing means.

The principal object of the present invention is to provide a simple coupling device capable of performing in one manipulation the operations of opening the connection to vacuum, supporting the milking unit and fixing it, and performing in another manipulation the operations of closing the connection to vacuum and releasing the milking unit for removal to another location.

According to the present invention, this object is achieved with a coupling device of the above-mentioned type by constructing the first connection means in such a way that it will act upon the valve body to open the passageway from the inlet to the outlet within the valve housing, when the two connection means are coupled together, one of the two connection means having a surface adapted to contact the other connection means and which is in the form of a truncated cone, at least one of the connection means being made of an elastic material, the two connection means being arranged to be kept together releasably by the pressure difference between the vacuum in the valve housing and the ambient atmosphere.

Preferably, the second connection means is in the form of a pierced truncated cone which tapers in a direction away from the valve housing.

In a further embodiment, the second connection means is made from a rubber material. This means that the valve housing is terminated by a pierced, truncated rubber cone which constitutes the second connection means, while the first connection means is a cover provided with a socket into which the truncated cone can be closely fitted. The first connection means is suitably made from a hard plastic and is connected via a pipe and/or tube to the milking means and the air separator or other unit associated therewith.

The valve housing may contain a spring-loaded slide constituting a valve body which, under spring load, normally closes the connection to a vacuum line.

The first connection means is provided with a projection which is preferably arranged centrally in the cover and which pushes the valve body from a shut position to an open position when the two connection means are connected. the pressure difference between the vacuum prevailing in the valve housing and the ambient atmosphere pushes the two connection means together to a safe connection, due to the truncated conical contact surface which gives a wedge effect, thereby supporting and safely fixing the milking means connected to the first connection means and the air separator or other unit connected to the milking means, even if the cow should kick.

Figure 2:
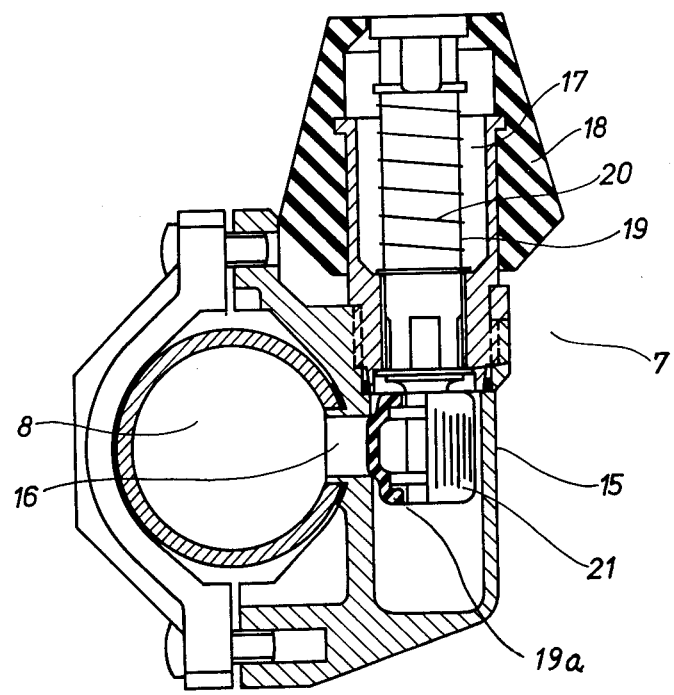
Figure 3:
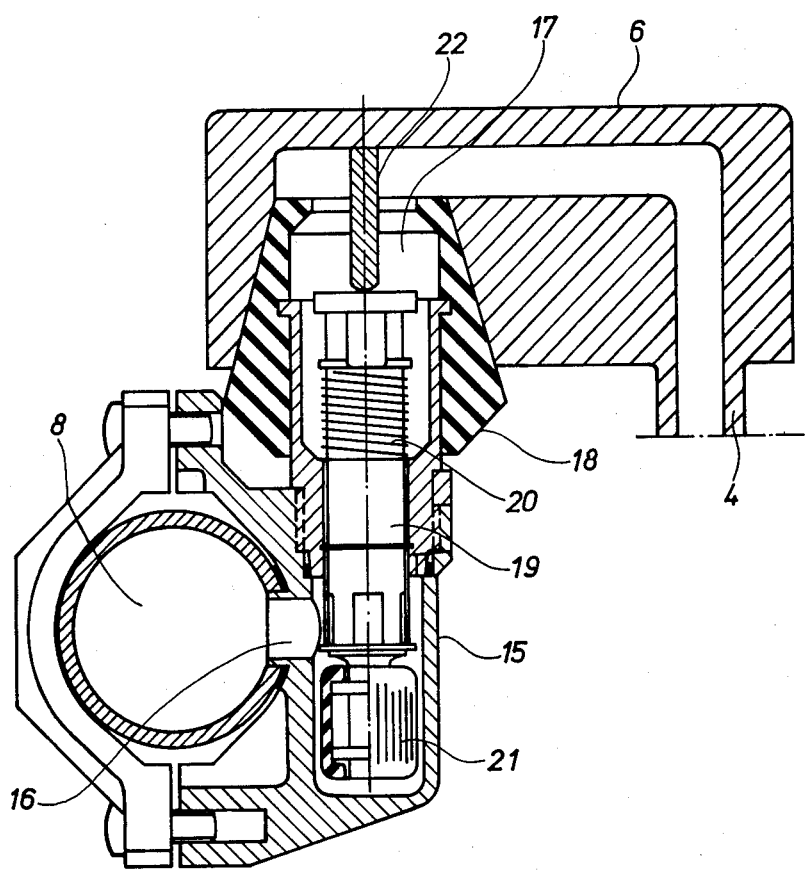

One embodiment of the invention will now be described more in detail by way of example only, reference being made to the accompanying drawings in which FIG. 1 is an elevational view of a milking means with connected units, coupled to a vacuum line with a coupling device according to the invention, FIG. 2 is an enlarged sectional view of the valve part of the coupling device in FIG. 1, showing one of the connection means and with the valve in a shut position;

and FIG. 3 is a view similar to FIG. 2 but showing the two connection means connected, the valve being open.

In FIG. 1 of the drawings, reference numeral 1 designates a milking means comprising a cluster of teat cups connected to a claw 1a which, in turn, is connected through milk hose 1b to a separating unit 2 for separating air and foam from the milk. A pulsator 3 is connected through hose 3a, claw 1a and tubes 1c to the spaces surrounding the usual flexible liners of the teat cups, thereby providing the milking means with a pulsating vacuum in a manner well known to those skilled in the art. A pipe 4 having a handle 5 is rigidly connected at its upper end to a first connection means 6 by which the pipe is releasably connected through a valve 7 to a vacuum line 8. At its lower end, pipe 4 supports the separating unit 2 and communicates therewith to provide a substantially constant vacuum for drawing milk through hose 1b from the teat cups. Foam and milk are sucked separately from unit 2 through tubes 9 and 10 connected through couplings 11 and 12 to pipes 13 and 14.

Valve 7, which is shown in a closed position in FIG. 2, comprises a valve housing 15 having an outlet 16 leading into vacuum line 8 and also having an inlet 17 provided with a second connection means 18 in the form of a truncated rubber cone. A valve body 19 is urged upwardly by a spring 20 into such a position that a flexible cylindrical membrane 19a in the lower end of valve body 19 covers outlet 16, shutting the passageway through the outlet. Connection means 18 has a substantially vertical axis of symmetry and forms the inlet 17 at its upper part.

In FIG. 3, showing the valve in its open position, the same reference numbers have been used as in FIG. 2. As in FIG. 1, the first connection means 6 in FIG. 3 is made from hard plastic and is provided with a rod 22 arranged centrally in the cover part. Rod 22 in the position shown pushes valve body 19 downward against spring 20, thereby opening the passageway from inlet 17 to outlet 16 in valve housing 15. Only the upper part of pipe 4 is shown in FIG. 3.

When the mobile milking unit comprising milking means 1, separating unit 2 and pulsator unit 3 is to be mounted for milking, it is hung up by fitting the first connection means 6 over the second connection means 18. Valve 7 is thus opened, and the pressure difference between the vacuum in valve 7 and the ambient atmosphere pushes the two connection means together, the conicity of the contact surface allowing the two connection means to be kept together efficiently. Then tubes 9 and 10 are connected to pipes 13 and 14 by means of couplings 11 and 12, and the milking operation can be started. Now the mobile milking unit is safely fixed despite any kicking by the cow. When the milking operation has been terminated, couplings 11 and 12 are first undone, whereupon the first connection means 6 is forced to some extent sidewards, which is possible due to the elasticity of the connection. Thus, air is admitted to inlet 17, and the uniting pressure difference is released. The mobile milking unit may then be moved to any desired location.

I claim:

1. In combination with an external object and a vacuum line, a coupling device comprising a first connection means with which said external object is provided, and a valve including a housing having an outlet adapted to communicate with said vacuum line and also having an inlet, a second connection means forming said inlet and which is adapted to be coupled with said first connection means, said housing forming a passage from said inlet to said outlet, the valve also including a valve body in said housing and a spring urging the valve body to a first position for closing said passage, said first connection means having a member operable to move the valve body to a second position for opening said passage when the two connection means are coupled together, one of said connection means having a contact surface in the form of a truncated cone engageable with a complementary surface of the other connection means, at least one of the connection means being made of an elastic material, the two connection means being releasably held together, with their respective said surfaces engaging each other, by the pressure difference between the vacuum in the valve housing and the ambient atmosphere when the two connection means are coupled together, said second connection means being made of a rubber material in the form of a pierced truncated cone which tapes in a direction away from the valve housing, said truncated cone having a substantially vertical axis of symmetry and at its upper portion forming said inlet.

2. The combination of claim 1, in which said external object is a mobile milking unit having a pipe rigidly connected to said first connection means and through which the milking unit is at least partly supported when the two connection means are coupled together, the pipe providing communication from the milking unit to said vacuum line when the two connection means are coupled together.

3. In combination with a vaccum line and an external object to be separably connected to said line, a coupling device comprising a first connection means with which said external object is provided, and a valve including a housing having an outlet adapted to communicate with said vacuum line and also having a second connection means forming an inlet to the housing, said housing forming a passage from said inlet to said outlet, the valve also including a valve body in said housing and means urging the valve body to a first position for closing said passage, said first connection means having a member operable to move the valve body to a second position for opening said passage when the two connection means are coupled together, one of said connection means having a contact surface in the form of a truncated cone tapering to an end of said one connection means, the other connection means having a surface complementing said contact surface and engageable therewith over substantially the entire taper thereof, at least one of said connection means being made of an elastic material, the two connection means when coupled together being releasably held together, with their respective said surfaces engaging each other, substantially entirely by the pressure difference between the vacuum in the valve housing and the ambient atmosphere, said elastic material permitting one of the connection means to be moved relative to the other in a direction laterally of the axis of said truncated cone when the two connection means are coupled together, thereby allowing passage of atmospheric air into the valve housing to reduce said pressure difference and thus facilitate separation of the two connection means from each other.

* * * * *